March 27, 1945.  C. JOHNSON  2,372,427

MACHINE TOOL CONTROL

Filed Sept. 23, 1941  7 Sheets-Sheet 2

Inventor
CLARENCE JOHNSON
By Raymond D. Junkins
Attorney

Inventor
CLARENCE JOHNSON
By Raymond D. Junkins
Attorney

Patented Mar. 27, 1945

2,372,427

UNITED STATES PATENT OFFICE 2,372,427

MACHINE TOOL CONTROL

Clarence Johnson, South Euclid, Ohio, assignor to Bailey Meter Company, a corporation of Delaware Application September 23, 1941, Serial No. 412,017

24 Claims. (Cl. 82—14)

This invention relates to duplicators or profilers as they are sometimes called, for machine tools, such as lathes, slotters, planers, milling machines, die sinking machines, and the like.

One object of my invention is to provide a duplicator in which the accuracy with which a work piece is shaped is unaffected by tool wear.

A further object of my invention is to provide a duplicator wherein a desired contour or shape is accurately produced on a work piece regardless of misalignment between the parts or strain or wear of the parts of the machine tool.

Still another object of my invention is to provide a duplicator which may be readily applied to a wide variety of machine tools.

A further object of my invention is to provide a duplicator wherein the tool and work piece are relatively moved from a direct comparison between the contour or shape of the master and the work piece.

Another object of my invention is to provide a duplicator wherein the linear cutting speed of the tool relative to the work is maintained constant or varied in predetermined manner.

Further objects will be apparent from the description and drawings in which.

As is well understood by those familiar with the art, in some machine tools, such as lathes, the tool is moved longitudinally and transversely of the work piece, which except for rotation about its center remains stationary. In other machine tools, such as some types of milling machines, the work piece may be moved in two directions, while the tool except for rotation about its axis, remains stationary. In some other types of milling machines, and usually in die sinking machines, the tool may be moved in one or more directions and the work piece also moved in one or more directions. In all instances it will be observed, however, that it is the relative movement between the tool and work piece that causes the work piece to be formed to a desired shape. As one specific embodiment I have chosen to illustrate and describe my invention incorporated in a lathe, wherein the work piece except for rotation about its center remains stationary and the tool is moved transversely and longitudinally thereof. As another specific embodiment of my invention I have illustrated my invention applied to a milling machine wherein the tool, except for rotation about its center remains stationary and the work piece is moved in two directions in order that the tool may cut the work piece to a desired shape. It will thus be evident that my invention is applicable to a wide variety of machine tools, and that when I speak of relative movement between the tool and work piece I include either an arrangement where the tool is stationary and the work piece moves, or the work piece is stationary and the tool is moved, or the combination of the two.

Certain features disclosed in this application are also disclosed in my copending applications, Serial Nos. 298,290, now Patent No. 2,259,472, issued October 21, 1941, and 384,375, filed in the United States Patent Office on October 6, 1939, and March 20, 1941, respectively, of which the instant application is a continuation-in-part.

Figure 1:
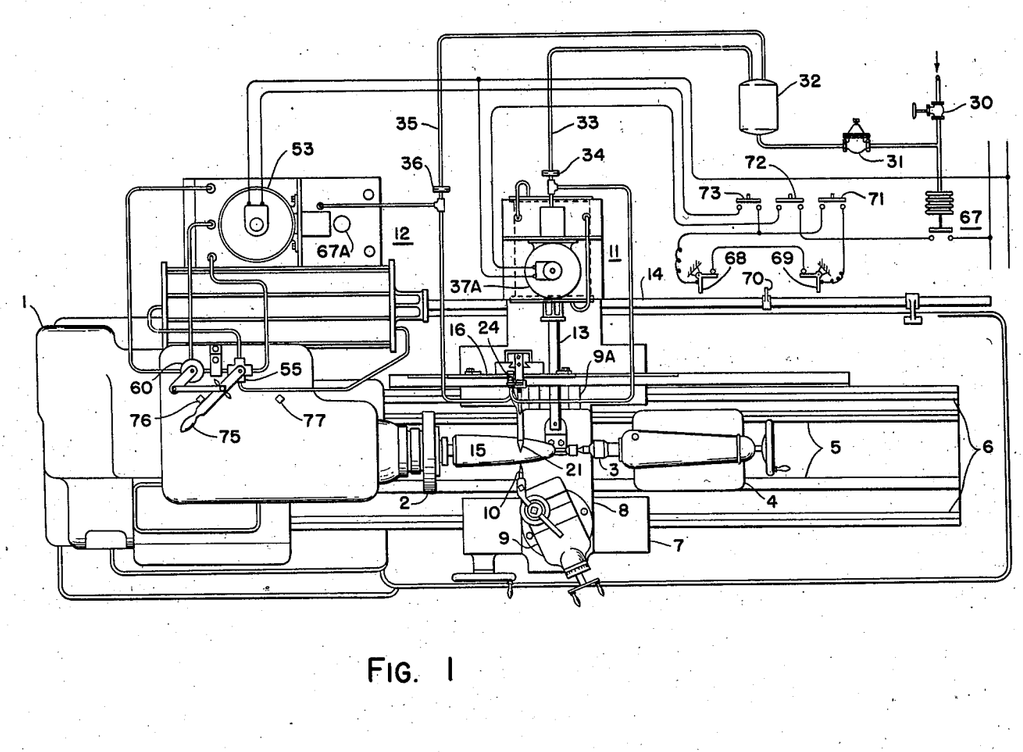
Fig. 1 is a plan view of an engine lathe illustrating the application of my invention thereto.

Referring to Fig. 1, I show my invention applied to an engine lathe 1 having a headstock 2 adapted to be rotated at desired speed by any suitable means (not shown) and a tailstock 3. A carriage 4 movable longitudinally along the bed of the lathe in suitable ways 5 supports the tailstock 3. Also movable longitudinally along the bed of the lathe in suitable ways 6 is a carriage 7. Mounted on the carriage 7 is a cross-slide 8, movable on ways 9A transversely of the bed of the lathe.

The cross-slide 8 is provided with an adjustable tool support 9 in which is secured a tool 10. Transverse movements of the tool 10 are produced by means of a hydraulic servo-motor generally indicated at 11 supported on an extension of the carriage 7 and which is connected by means of a piston rod 13 to the cross-slide 8. Longitudinal movements of the tool 10, that is movements of the tool parallel with the bed of the lathe, are produced by means of a hydraulic servo-motor generally indicated at 12, which as shown is secured to the bed of the lathe and connected by means of a piston rod 14 to the carriage 7.

Supported by the headstock 2 and tailstock 3 is a work piece 15, which for illustrative purposes is shown as being formed to a parabolic shape by the tool 10. The particular shape which I have illustrated the work piece 15 as being formed to has no significance, it being apparent, as the description proceeds, that by my invention a work piece may be formed automatically to any desired contour.

Figure 4:
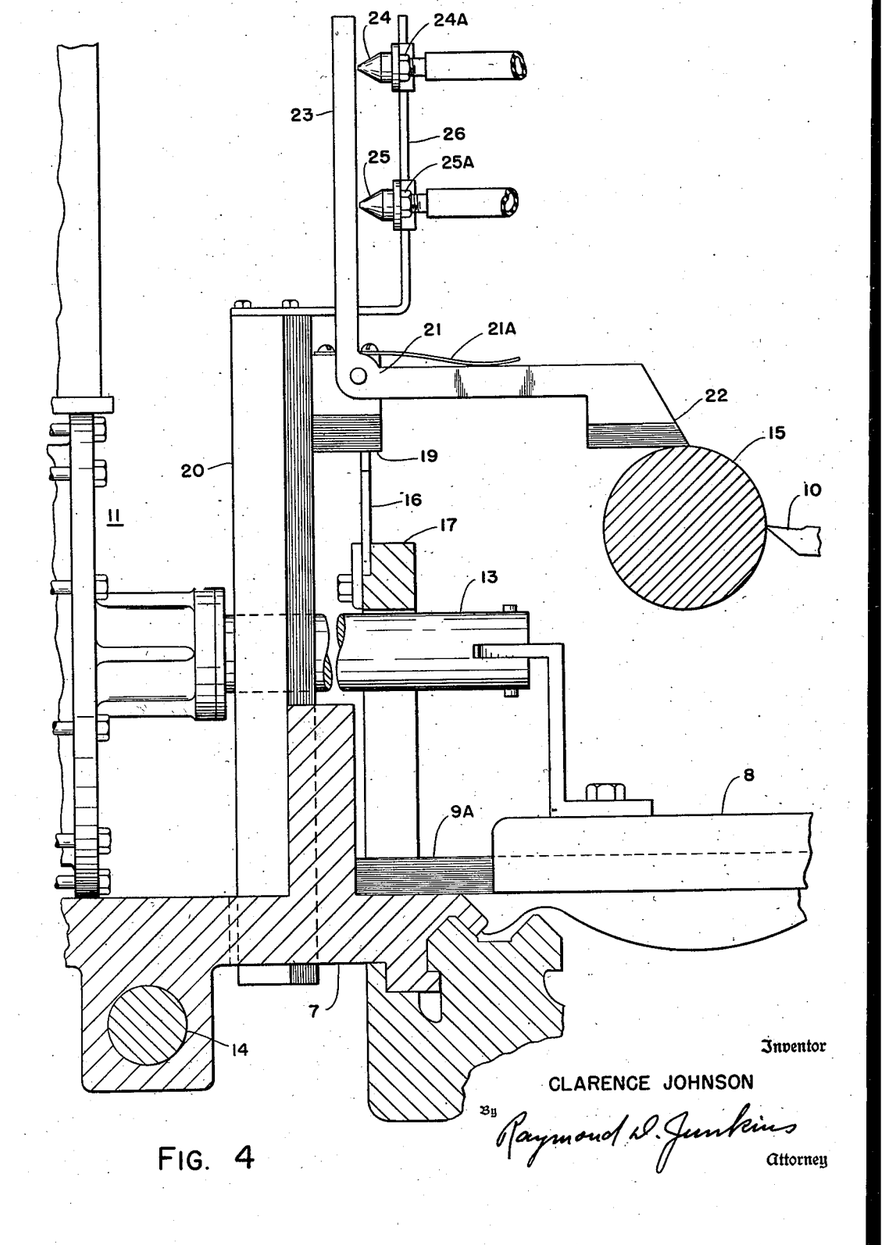
Fig. 4 is an elevation view to larger size of the tracer mechanism shown in Fig. 1.
Figure 5:
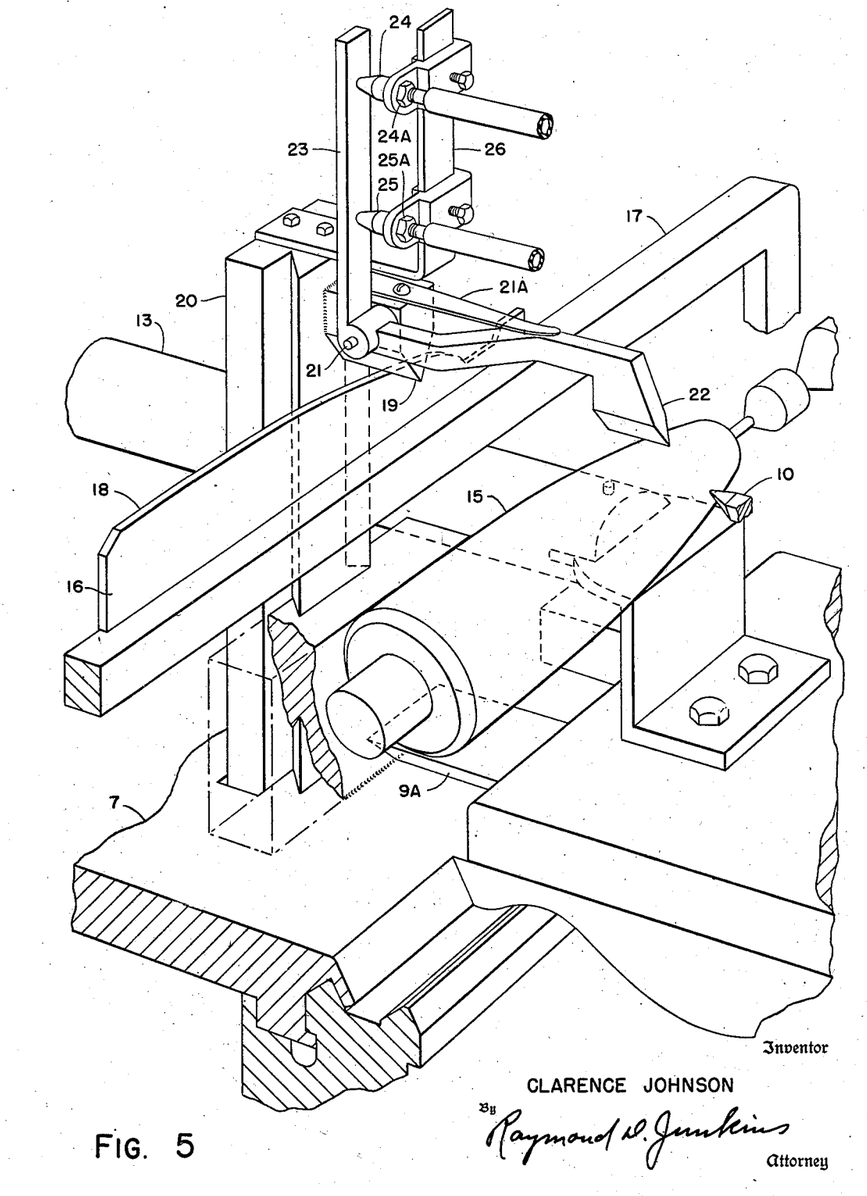
Fig. 5 is an isometric illustration of the tracer mechanism shown in Fig. 4.

In accordance with my invention, the work piece 15 is formed to any desired shape and size by continuously comparing its diameter at substantially the point it is engaged by the tool 10 with a corresponding point on a master or pattern. If such comparison indicates that a discrepancy exists between the actual size or shape of the work piece and that desired, the tool and work piece are relatively moved to remove such discrepancy. In Figs. 4 and 5 I show to larger size the form of tracer mechanism illustrated in Fig. 1 whereby I obtain a comparison between the work piece and master, and in Fig. 2 I show diagrammatically the control circuits whereby the tool and workpiece are relatively adjusted in accordance with such comparison.

Referring first to Figs. 4 and 5, I therein show a master 16 clamped to a support bar 17 which is secured to the bed of the lathe 1. The master 16 has a profile 18 corresponding to the desired profile of the work piece 15. It is evident that the master 16 may be shaped with any desired profile and, as will now be explained, the work piece 15 will be accurately shaped to the form and size of the master.

Engaging the profile 18 of the master is a master follower 19, which is shown in the form of a horizontal projection of a vertical slide 20 held in position by suitable ways in the carriage 7. The slide 20 and accordingly the master follower 19 are positioned longitudinally along the lathe with the carriage 7. The slide 20 will however be positioned vertically relative to the carriage 7 in accordance with changes in shape of the master 16.

Pivoted to the master follower 19 is a bell crank 21 having a horizontal arm forming a work follower 22, which engages the work piece 15, and a vertical arm 23 forming a baffle or valve plate for nozzles 24 and 25, the latter being adjustably mounted on a support 26 secured to the slide 20. It will be observed that so long as the master follower 19 and work follower 22 move up or down in unison, the baffle 23 will not shift relative to the nozzles 24 and 25. When, however, there is a rise in the profile of the master 16, the baffle 23 will be positioned in a clockwise direction, thereby moving toward the nozzles 24 and 25. Conversely when there is a fall or depression in the master 16 the baffle 23 will be positioned in a counterclockwise direction, thereby moving away from the nozzles 24 and 25. Similarly, if the diameter of the work piece 15 increases, causing the work follower 22 to move upwardly, the baffle 23 will move away from the nozzles 24 and 25, whereas a decrease in diameter of the work piece 15 will cause the work follower 22 to be positioned downwardly and the baffle 23 to move toward the nozzles 24 and 25. A spring 21A may be provided for urging the bell crank 21 in a clockwise direction so that the work follower 22 is urged against the work piece 15.

The master follower 19, work follower 22, and tool 10 are in the same plane at right angles to the axis of the work piece 15, so that it may be said that the tracer mechanism in effect compares the shape or size of the work piece 15 immediately after being formed by the tool 10 to that of the master 16 and causes the baffle 23 to be positioned relative to the nozzles 24 and 25 in accordance with any discrepancy therebetween. Or again it may be said that the tracer mechanism simultaneously scans the master 16 and work piece 15 and moves the baffle 23 relative to the nozzles 24 and 25 in accordance with any discrepancy between the two shapes. By means now to be described movements of the baffle 23 toward or away from the nozzles 24 and 25 control the movements of the tool 10 so that the work piece 15 is shaped to correspond to the shape of the master 16.

Figure 2:
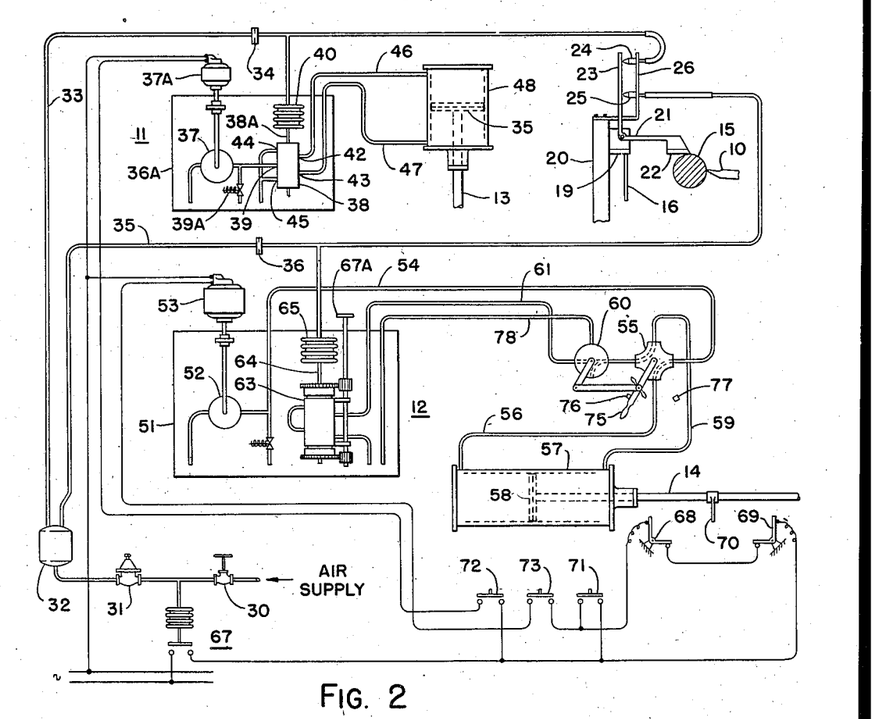
Fig. 2 is a diagrammatic illustration of the control circuit employed in the embodiment of my invention shown in Fig. 1.

Referring now to Fig. 2, I show in diagrammatic fashion the tracer mechanism and the control circuits whereby movements of the baffle 23 relative to the nozzles 24 and 25 position the tool 10 relative to the work piece 15. The nozzles 24 and 25 are supplied with a suitable fluid under pressure, such as compressed air, from any suittable source (not shown) and continuously discharge the pressure fluid to the atmosphere in the form of jets against the baffle 23. Pressure fluid for the nozzles 24 and 25 first passes through a shutoff valve 30, a reducing valve 31, and a stabilizing volume tank 32. Pressure fluid for the nozzle 24 is transmitted through a pipe 33 in which is an orifice or other suitable restriction 34, and that for the nozzle 25 through a pipe 35 in which is an orifice 36.

Movements of the baffle 23 toward the nozzles 24 and 25 cause proportional decreases in the discharge of pressure fluid therefrom, thereby causing an increase in pressure in the sections of pipes 33 and 35 between the orifices 34, 36 and nozzles 24, 25 respectively. Conversely, movements of the baffle 23 away from the nozzles 24 and 25 cause proportionate increases in the discharge of pressure fluid therefrom, thereby decreasing the pressure within the sections of pipes 33 and 35 beyond orifices 34 and 36. For each particular distance between the baffle 23 and nozzles 24 and 25 a predetermined pressure will exist within the sections of pipes 33 and 35 beyond orifices 34 and 36. When proper correspondence exists between the contours of the work piece 15 and master 16 a definite pressure which for convenience I call the "normal pressure" will exist in the sections of pipes 33, 35 beyond orifices 34, 36. This normal pressure may be brought to a desired value by moving the nozzles 24 and 25 toward or away from the baffle 23 by the adjustments provided, comprising nuts 24A and 25A (Figs. 4 and 5). In the embodiment of my invention now being described, the arrangement is such that when normal pressure exists the servo-motor 11 governing transverse movements of the tool 10 remains stationary, whereas the servo-motor 12 governing longitudinal movements of the carriage 7 is operated at maximum speed.

The servo-motor 11 is shown in diagrammatic fashion in Fig. 2 and comprises a power unit for positioning the cross-slide 8 in one direction when the pressure established by nozzle 24 and baffle 23 is above the normal value, and in opposite direction when the pressure is below the normal value. The speed with which the cross-slide is positioned will depend upon the amount of departure of the pressure from the normal value. The servo-motor 11 includes a reservoir 36A for a hydraulic fluid such as oil, in which is disposed a pump 37 driven by a suitable motor 37A. The pump 37 draws oil from the reservoir and discharges it into the inlet port 39 of a pilot valve 38. A suitable relief valve 39A may be provided to maintain the discharge pressure from the pump 37 below a predetermined value. The pilot valve 38 has a movable valve stem 38A connected at its upper end to the movable head of an expansible bellows 40 connected to the pipe 33 beyond the orifice 34. Upon an increase in pressure within the pipe 33 the bellows 40 will expand, causing the valve member 38A to move downwardly. Conversely, upon a decrease in pressure within the pipe 33 the bellows 40 will contract, causing the movable valve member 38A to move upwardly.

In my earlier filed copending applications Serial Nos. 298,290 and 384,375, to which reference has previously been made, I disclose in detail the servo-motor 11 and particularly the pilot valve 38. Sufficient it is to state here that the valve member 38A has a mid or neutral position when there is no communication or such communication between the inlet port 39 and outlet ports 42 and 43 that the forces acting on opposite sides of a piston 35 are equal. Upon downward movement of the valve member 38A from the neutral position the outlet port 42 is placed in communication with the inlet port 39 and the outlet port 43 in communication with an exhaust port 45. Upon upward movement of the valve member 38A from the neutral position the outlet port 43 is placed in communication with the inlet port 39, and the outlet port 42 in communication with the exhaust port 45.

The outlet ports 42 and 43 are connected by means of pipes 46 and 47 to a cylinder 48 on opposite sides of the piston 35 driving the piston rod 13. When normal pressure exists within pipe 33 the movable valve member 38A is in the neutral position, so that the piston 35 remains stationary. When the pressure within pipe 33 increases above the normal value however, causing the valve member 38A to move downwardly, oil under pressure will be transmitted through pipe 46 to the upper side of the piston 35 as viewed in Fig. 2, thereby causing the piston to move downwardly. Oil from the lower side of piston 35 will be transmitted through pipe 47 and pilot valve 38 to the oil reservoir 36A. A decrease in pressure within pipe 33 will cause a movement of the piston 35 in opposite direction.

Assuming for example that due to wear of the tool 10 the work piece 15 increases slightly in diameter, the pressure within the pipe 33 will decrease because of the movement of the baffle 23 away from the nozzle 24. Oil under pressure will then pass from the pump 37 to the lower side of the piston 35, causing the cross-slide 8 to be positioned in a direction to move the tool 10 toward the work piece 15. Such movement of the tool 10 will continue until the pressure within pipe 33 is restored to the normal value. Upon a rise in the master 16 the master follower 19 will move upwardly, causing the baffle 23 to approach the nozzle 24, increasing the pressure within pipe 33 and causing valve member 38A to move downwardly from the neutral position. Oil under pressure will then pass from the pump 37 to the upper side of the piston 35, causing the tool 10 to be moved away from the work. As the diameter of the work piece 15 increases, the work follower 22 will be moved upwardly, and when the increase in diameter of the work piece 15 corresponds to the rise of the master 16, the baffle 23 will be restored to the normal position, and the valve member 38A to the neutral position.

When the shape of the work piece 15 corresponds to that of the master 16 the tool 10, as will be appreciated by those familiar with the art, may be moved longitudinally along the lathe at a relatively high speed. However, when a transverse movement of the tool 10 is required, it is desirable that the longitudinal speed of the carriage along the lathe be decreased. The decrease in longitudinal speed is preferably proportional to the taper desired on the work piece, and if the work piece is to be formed with a shoulder at right angles to its axis, then the carriage is preferably stopped until the required transverse movement of the tool is completed. That such operation is desirable will be appreciated from a consideration of the fact that the absolute movement of the tool 10 relative to the work piece 15 is determined by the component of its motion in a direction transverse to the longitudinal axis of the lathe, and its motion parallel to the axis of the lathe. Accordingly, if it is desired that a shoulder, for example, be formed on the work piece 15, longitudinal movement of the tool 10 should be stopped during the period of time that it is being moved transversely. Accordingly, I combine with the transverse control of the tool 10, which I have described, a control of the longitudinal movement of the tool 10, which I will now describe.

Again referring to Fig. 2 it will be observed that the pressure within that portion of the pipe 35 beyond the orifice 36 changes in correspondence with changes in the pressure within the pipe 33 beyond the orifice 34, and that when the normal distance exists between the baffle 23 and nozzles 24 and 25 a predetermined normal pressure will exist within the pipe 35. The pressure within the pipe 35 controls the operation of the servo-motor 12, and accordingly the rate at which the tool 10 is moved longitudinally along the lathe. When normal pressure exists within the pipe 35 the tool 10 is moved longitudinally along the lathe at a desired maximum speed, and upon an increase or decrease in pressure from the normal, the longitudinal rate of movement of the tool 10 is decreased, and at a predetermined minimum or maximum pressure the longitudinal movement of the tool 10 is stopped. The servo-motor 12 for operating the carriage 7, upon which the tool 10 is mounted, is in general similar to the servo-motor 11 and includes an oil reservoir 51 in which is disposed an oil pump 52 driven by a motor 53. The pump 52 is connected by way of a pipe 54, 4-way valve 55, and pipe 56, to a cylinder 57 on one side of a piston 58 driving the piston rod 14. The cylinder 57 on the opposite side of the piston 58 is connected by means of a pipe 59, 4-way valve 55, 3-way valve 60, and pipe 61 to a fluid resistance 63, from which it is discharged into the oil reservoir 51. When normal pressure exists within pipe 35, the fluid resistance 63 is at a minimum, so that the piston 58 and accordingly the connected piston rod 14 is positioned to the right as shown in Fig. 2 at maximum speed. However, when there is an increase or decrease of pressure within the pipe 35 from the normal pressure, the fluid resistance 63 increases, thereby slowing the rate of movement of the piston 58, and upon the pressure reaching a predetermined minimum or maximum the discharge of fluid through the resistance 63 will substantially stop, thereby stopping longitudinal movement of the carriage 7.

In my earlier filed copending application, Serial No. 384,375, previously referred to, I disclose in detail the fluid resistance 63. In general, it may be said that it is provided with a movable member 64 vertically positioned as shown in Fig. 2 by means of an expansible bellows 65, which is connected to the pipe 35 between orifice 36 and nozzle 25. Movements of the valve member 64 upwardly or downwardly from a neutral position by virtue of the expansion or contraction of the bellows 65, effect increases in fluid resistance. A suitable adjusting means, as shown at 67A, may be provided whereby the resistance to fluid flow existing when normal pressure exists within the bellows 65 may be varied so that normally the carriage 7 will move longitudinally along the lathe at a desired maximum speed.

The control system shown in Fig. 2 may be provided with various safety and other devices for facilitating operation. Thus I show connected in the power supply to motors 53 and 37A an air pressure failure switch 67 which prevents their operation unless air pressure is available for the nozzles 24 and 25. Also shown connected in circuit with motor 53 are limit switches 68 and 69 arranged to be operated by a projection 70 carried by the piston rod 14. The switches may be adjusted so that upon the tool reaching either end of the master 16 motor 53 is deenergized, thereby preventing further travel of the carriage which might result in damage to the tool or other parts of the lathe. A push button station 71 allows the operator to reenergize motor 53 after the power supply thereto is broken, either at switch 68 or 69. Also connected in circuit with motors 37A and 53 are manually operable switches 72 and 73 respectively, which afford the operator instantaneous control over the transverse or longitudinal feed of the tool 10.

As shown in Fig. 1, the tool 10 is arranged to traverse the work piece 15 from left to right. Upon the tool reaching the end of the work piece motor 53 will be deenergized as heretofore described by switch 69 opening. The tool 10 can then be moved transversely away from the work piece 15 by the baffle 23 being manually moved relative to the nozzle 24. In order that the tool 10 may be returned to the left end of its travel I provide a hand operable lever 75 for simultaneously operating the 4-way valve 55 and the 3-way valve 60. Thus upon the tool 10 reaching the right end of its travel the switch 69 will open, deenergizing motor 53. The operator will then relatively move baffle 23 and nozzle 24 so that the tool is positioned away from the work. Lever 75 would then be shifted from stop 76 to a stop 77 and the circuit to motor 53 would be closed by means of push button station 71. Shifting of lever 75, as shown in Fig. 2, connects pipe 59 to the supply pipe 54 and pipe 56 to a waste pipe 78 through the 3-way valve 60. Thus supply pressure will be effective on the right-hand side of piston 58, whereas the pressure on the left-hand side of piston 58 will be released. The carriage will then be positioned at a rapid rate to its initial starting position.

Figure 3:
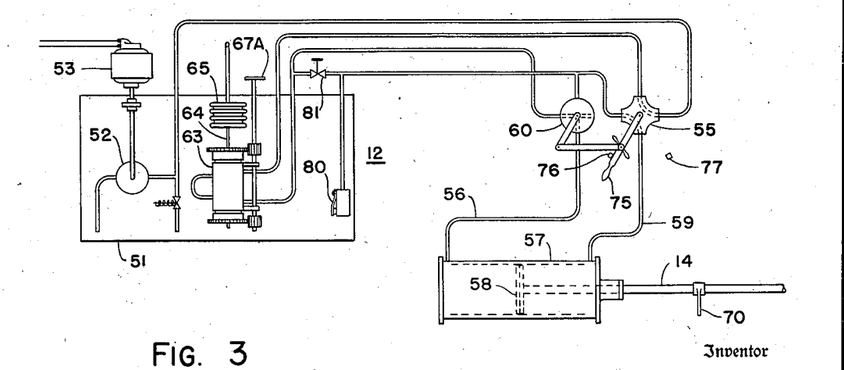
Fig. 3 is a modification of a part of the circuit illustrated in Fig. 2.

In Fig. 3 I show a modified form of hydraulic circuit for the servo-motor 12. Therein pressure fluid from the pump 52 does not pass directly to the cylinder 57, but after leaving the 4-way valve 55 passes through the fluid resistance 63, and thence to the cylinder 57 through the 3-way valve 60. Fluid exhausted from the cylinder 57 during the working stroke of the piston 58 passes through the 4-way valve 55 and is exhausted into the oil reservoir 51 through a relief valve 80, which serves to maintain a predetermined pressure of relatively small magnitude in the exhaust line.

As heretofore described, when the movable member 64 of the fluid resistance 63 is in the mid position the resistance is at a minimum and increases upon the member 64 being positioned upwardly or downwardly. It is highly desirable that when the member 64 is in an extreme upper or lower position that the piston 58 remain stationary, as it is this condition which obtains when the master calls for a cut to be made at right angles to the center line of the work piece, and any motion of the piston 58 would cause inaccuracies. In order that any leakage through the resistance 63 when the member 64 is in a position calling for maximum resistance will not produce motion of the piston 58 I connect the outlet of the fluid resistance 63 to the exhaust line leading to the relief valve 80 through a bleed valve 81. The bleed valve 81 may be adjusted so that when the resistance 63 is at a maximum the piston 58, and accordingly the carriage 7, will be stationary.

It will be observed that except for this distinction the operation of the control system shown in Fig. 3 is the same as that illustrated in Fig. 2. During the working stroke of the piston 58 the lever 75 is in the position shown, so that fluid pressure from the pump 52 after passing through the fluid resistance 63 is admitted to the cylinder 57 on the left-hand side of the piston 58, thereby causing it to move at a rate varying with changes in the fluid resistance. A rapid traverse at the end of the working stroke is made by moving the lever 75 from the stop 76 to the stop 77 which connects the cylinder 57 on the right-hand side of piston 58 to the pump 52, and on the left-hand side to the relief valve 80 through the 3-way valve 60.

Figure 6:
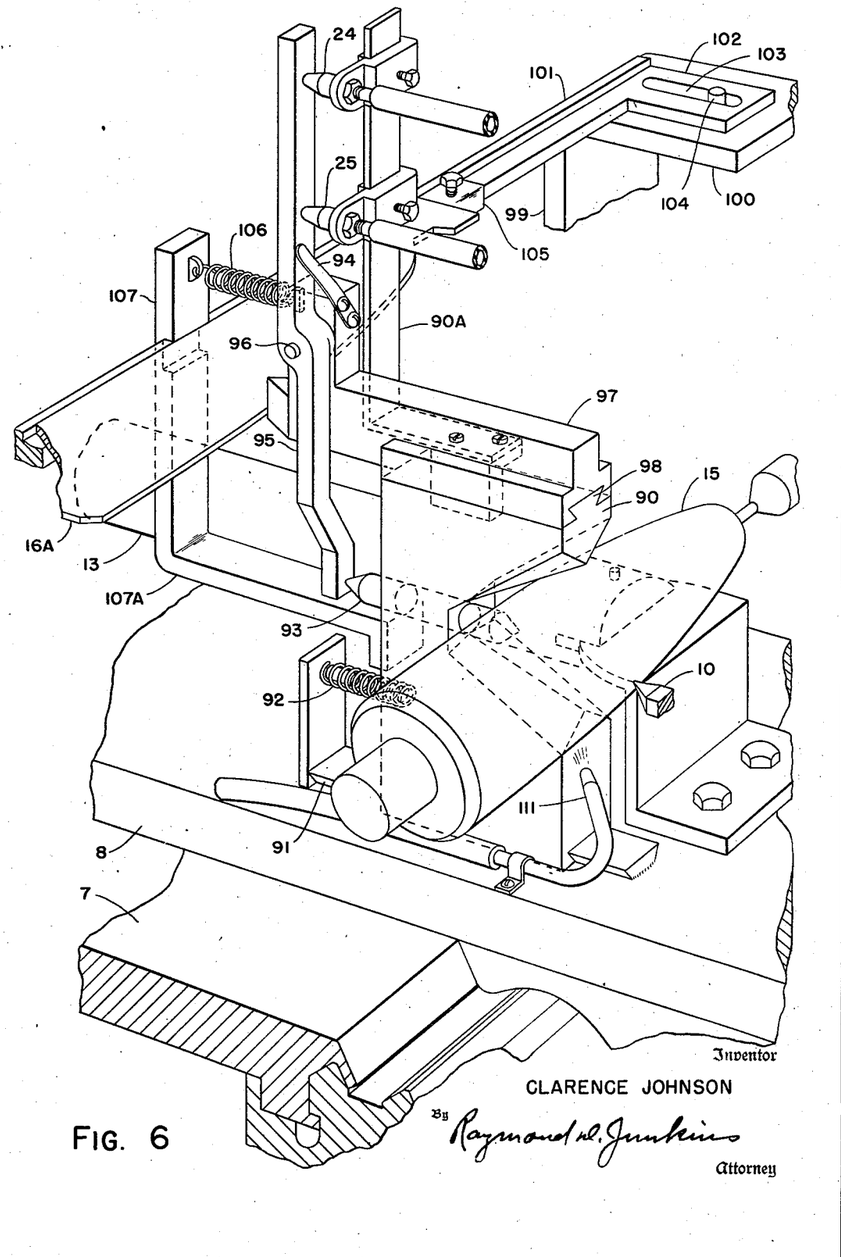
Fig. 6 illustrates a modified form of tracer mechanism.

In Fig. 6 I show a modified form of a tracer mechanism especially preferable for heavy work where the cutting operation imposes a heavy load on the machine tool. The elements of the tracer mechanism are so supported and constructed as to accurately shape the work piece notwithstanding the machine tool may be under heavy stress and strain. The mechanism also shapes the work piece accurately regardless of tool wear.

Referring to Fig. 6, a V-block 90 is reciprocable along a way 91 secured to the cross-slide 8. The V-block is urged against the work piece 15 by means of a spring 92. As the work piece 15 decreases in diameter the V-block 90 under the influence of the spring 92 will move to the right as viewed in the drawings, and when the work piece increases in diameter will move to the left. Disposed in the center of the V is a plunger 93 urged against the work piece 15 by a leaf spring 94, which urges baffle 95 about pivot 96 in a counterclockwise direction against the plunger. Pivot 96 is carried by a master feeler 97 movably supported on the V-block 90 in a way 98. Assuming that the master feeler 97 remains stationary it will be evident that if the diameter of the work piece 15 increases, causing the V-block 90 to be positioned to the left, the plunger 93 will move to the right relative to the V-block, due to the action of the spring 94 against the baffle 95. Conversely if the work piece 15 decreases in diameter, then the V-block 90 will move to the right, causing the plunger 93 to move to the left relative to it and effecting a clockwise positioning of the baffle 95 about the pivot 96 against the action of spring 94.

From the foregoing it will be observed, assuming that the master feeler 97 remains stationary, that a change in diameter of the work piece 15 causes a corresponding positioning of the baffle 95, such positioning being in a clockwise direction about the pivot 96 upon a decrease in diameter of the work piece 15 and in a counterclockwise direction upon an increase in diameter.

Nozzles 24 and 25 are adjustably secured to an upright member 90A secured to the V-block 90. As the baffle 95 is positioned in a clockwise or counterclockwise direction it approaches and recedes from the nozzles. Such positioning toward and away from the nozzles, as heretofore described, controls the pressure within the nozzles and through the control system illustrated in Fig. 2 and previously described, the longitudinal and transverse movements of the tool 10. Thus upon an increase in diameter of the work piece 15 the plunger 93 will be moved to the right relative to the V-block 90, causing the baffle 95 to move away from the nozzles 24 and 25. Such movement will effect a decrease in pressure within the nozzles 24 and 25 causing the tool 10 to be positioned to the left, as viewed in Fig. 6, and simultaneously to decrease the rate of movement of the carriage 7 along the lathe. When the diameter of the work piece has been restored to that desired, the movement of the tool 10 to the left will cease and the movement of the carriage 7 longitudinally along the lathe will increase to the optimum value. Upon a decrease in diameter of the work piece 15 the plunger 93 will be positioned to the left relative to the V-block 90, causing the baffle 95 to approach the nozzles 24 and 25, causing an increase in pressure therein. Such increase in pressure will cause the tool 10 to be positioned to the right, as shown in the drawings, and simultaneously to decrease the speed with which the carriage 7 is positioned longitudinally along the lathe. When the diameter of the work piece 15 has been restored to that previously existing the transverse movement of the tool 10 will cease and that of the carriage will be restored to optimum speed.

In the operation just described it has been assumed that it was wished to shape the work piece 15 to a cylinder. I will now describe the means whereby the work piece 15 may be shaped as desired in accordance with a master, such as the master 16A shown in Fig. 6. Referring to Fig. 6, secured to the lathe at a point adjacent the tailstock is a vertical support member 99 having a horizontal extension 100. A similar support adjacent the headstock is not shown in Fig. 6. Carried by the supports adjacent the head and tailstocks is a horizontal bar 101 provided at either end with an extension 102 having a slot 103 in which is disposed a pin 104 fastened to the horizontal extensions 100 of the supports 99. The bar 101 is therefore free to move transversely of the lathe by virtue of the slot and pin construction but not longitudinally thereof. The bar 101 is shaped to form a support for the master 16A, which is clamped to the former by means of clamps, such as shown at 105. Supported by and secured to the V-block 90 is a post 107. The bar 101 is urged against the post 107 by a tension spring 106 connected to the post 107 and master feeler 97. The spring 106 also holds the master feeler 97 against the shaped profile of the master 16A. As the carriage 7 is positioned longitudinally along the lathe, the post 107 slides along the bar 101, and the master feeler 97 will engage a point on the profile of the master 16A corresponding to the point on the work piece 15 engaged by the tool 10. It will be observed that so long as the profile of the master 16A is parallel to the axis of the lathe 1 and work piece 15, the master feeler 97 will remain stationary relative to the V-block 90. While this condition obtains the baffle 95 will be moved toward or away from the nozzles 24 and 25 solely because of changes in the shape of the work piece 15. A change in the profile of the master 16A will however cause the master feeler 97 to move relative to the V-block 90. Such movement will cause the baffle 95 to approach or recede from the nozzles 24 and 25. The change in pressure within the nozzles will then, as previously described, affect the transverse and longitudinal movements of the tool 10, so that the profile of the work piece 15 will be brought into correspondence with that of the master 16A. Thus upon a rise in the profile of the master 16A, causing the master feeler 97 to be positioned to the right as shown in the drawings relative to the V-block 90, the baffle 95 will be positioned toward the nozzles 24 and 25. Such positioning will cause the tool 10 to be positioned to the right, and hence duplicate upon the work piece 15 the rise or projection on the master 16A. Conversely upon a depression or fall in the profile of the master 16A the baffle 95 will move away from the nozzles 24 and 25, causing the tool 10 to be positioned to the left as shown in the drawings. When the size of the work piece has changed in correspondence with the change in the master, the relative positions of the baffle 94 and nozzles 24 and 25 will be restored to that existing prior to the change, and thereafter no further motion of the tool 10 in a transverse direction will occur unless there is a further change in the shape of the master, or in the shape of the work piece. It will be observed that by virtue of the fact that all of the elements comprising the tracer mechanism are supported by or operated from the V-block 90, strains in the parts of the machine tool will have no effect upon the accuracy of the mechanism, but that the mechanism directly compares the profile of the work piece 15 with that of the master 16A, and causes the tool 10 to be positioned in proper direction until desired correspondence is restored.

In order that chips formed in the cutting operation may be quickly removed so that accurate positioning of the V-block 90 will not be interfered with, a suitable air jet 111 may be provided to blow the chips away from the V-block.

Figures 7, 8:
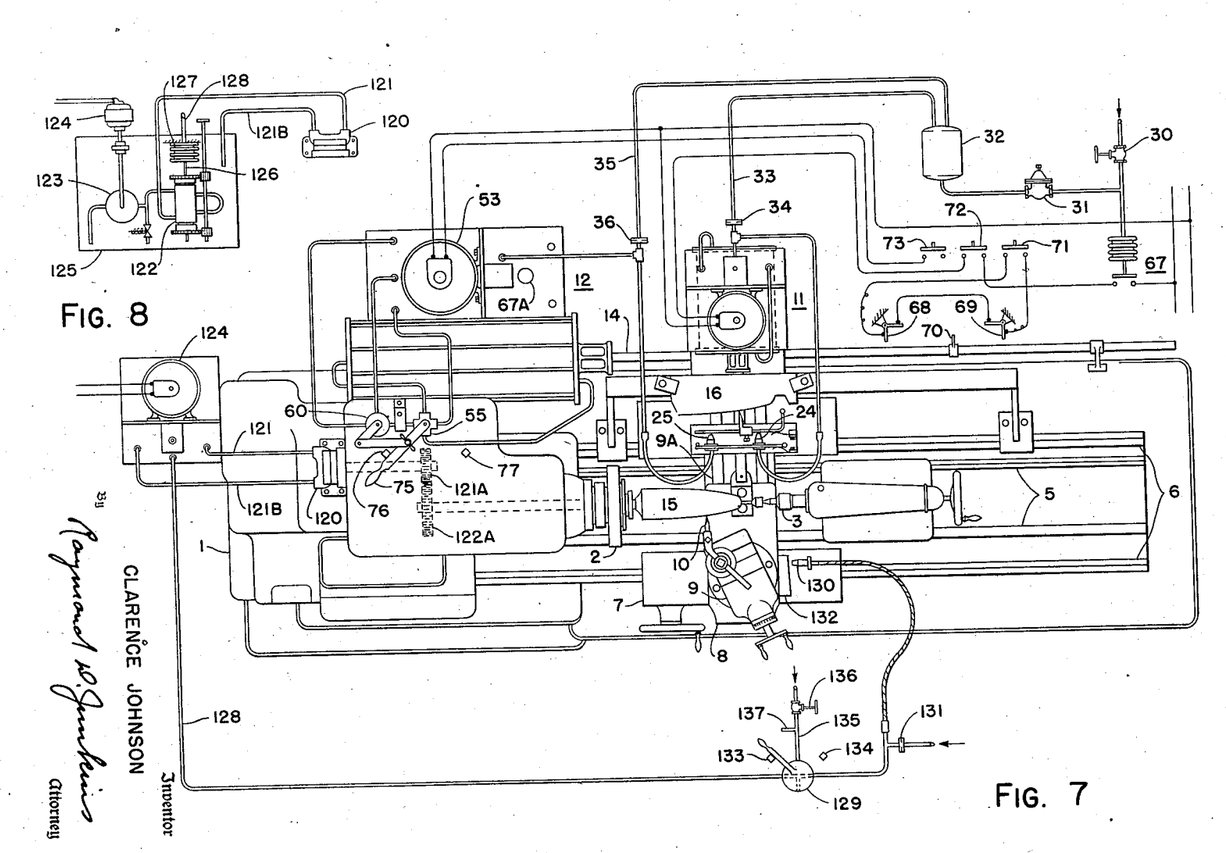
Fig. 7 illustrates a modified form of my invention applied to an engine lathe and incorporating additional features.
Fig. 8 illustrates diagrammatically a part of the control circuit employed in the embodiment of my invention shown in Fig. 7.

In Fig. 7 I show a further embodiment of my invention incorporating additional features. It is well appreciated that for optimum results the linear speed of the tool relative to the work piece should remain substantially constant or be varied in a predetermined manner. That is to say, there is an optimum speed with which the work is moved past the tool, or vice versa. In cutting operations, particularly turning operations, the linear speed of the work piece past the tool decreases as the tool approaches the center of rotation of the work piece, if the headstock is rotated at constant speed. Thus unless the turning operation is interrupted and the rotary speed of the headstock varied as the diameter of the work piece varies the turning operation will not be performed at maximum efficiency. It is particularly desirable that the speed of the headstock be automatically varied in accordance with changes in diameter of the work piece when the tool is automatically positioned relative to the work by a master, as such automatic operation dispenses entirely with the necessity of an operator devoting his attention to the operation of the lathe. Not only in so-called turning operations is it desirable that the linear speed of the work piece past the tool be varied, but also in other machining operations, and I illustrate my invention applied both to a lathe and to a milling machine, wherein for reasons that will be pointed out more in detail hereinafter the speed of the work piece past the tool is preferably varied in predetermined fashion.

Referring to Fig. 7, I therein show the lathe I wherein the tool 10 is automatically positioned transversely of the work piece 15, as well as longitudinally thereof, in accordance with changes in the shape of the master 16. Additionally thereto I further show in Fig. 7 apparatus whereby the work piece 15 is rotated at a variable speed depending upon the radial position of the tool 10. My invention contemplates that the speed with which the work piece 15 is rotated may be varied in any predetermined desired manner. Generally, however, it is thought preferable to have the work piece 15 rotate at an increasing speed as the tool 10 approaches the center of rotation.

Referring to Fig. 7, I show the headstock 2 rotated by a hydraulic motor 120 through gears 121A and 122A. In Fig. 8 I show diagrammatically the fluid control circuit for the hydraulic motor 120. In general, it will be observed that the control circuits are similar to those illustrated in Fig. 3 for the servo-motor 12. Hydraulic fluid under pressure is transmitted to the motor 120 through a pipe 121 connected to the outlet of a variable fluid resistance 122 which is supplied with hydraulic fluid from a suitable pump 123 driven by a motor 124. The pump 123 and fluid resistance 122 are for convenience housed in an hydraulic fluid reservoir 125 and the hydraulic fluid discharged from the motor 120 is returned thereto through a pipe 121B.

As described with reference to the fluid resistance 63, shown in Fig. 2, the fluid resistance 122 at some position of the movable member 126 has a minimum resistance at which position the flow of oil to the motor 120 will be at maximum, and accordingly the headstock 2 will rotate at maximum speed. If the member 126 is positioned upwardly or downwardly from this position the fluid resistance 122 will increase, thereby causing the motor 120 and headstock 2 to rotate at a slower speed.

The position of the member 126 is controlled by an expansible bellows 127 connected through a pipe 128 and 3-way valve 129 to a nozzle 130 carried by the movable carriage 7. Air under pressure is supplied the pipe 128 through an orifice 131. As described with reference to the operation of the nozzles 24 and 25, as the rate of discharge through the nozzle 130 decreases, the pressure within the pipe 128 will increase, thereby causing the bellows 127 to position the member 126 downwardly. Conversely upon an increase in the rate of discharge from the nozzle 130 the bellows 127 will contract, causing the member 126 to move upwardly, causing a corresponding change in the resistance of the fluid resistance 122.

The rate of discharge through the nozzle 130 is controlled by means of a cam 132 secured to the cross-slide 8. The cam 132 may be given any shape desired, so that the magnitude of the fluid resistance 122, and accordingly the speed of the motor 120 and headstock 2 will be varied as desired. For reasons heretofore stated it is usually preferable to have the rotative speed of the work piece 15 increase as the tool 10 is positioned toward the center thereof. Accordingly, under usual operating conditions the cam 132 will be provided with a straight taper and adjusted relative to the nozzle 130, so that when the tool 10 is at the maximum radial distance from the center of rotation of the work piece 15 the member 126 will be positioned so that the fluid resistance 122 is at a maximum, and thereafter as the tool 10 approaches the center of rotation of the work piece 15 the speed of rotation thereof will increase. It will be evident, however, that the cam 132 may be given any shape whatsoever to produce a desired functional relation between the transverse positioning of the tool 10 and speed of rotation of the work piece 15.

In order that the fluid motor 120 may be manually operated at any desired speed, I provide the three-way valve 129, which in the position shown places the bellows 127 under the control of the nozzle 130. When the three-way valve 129 is shifted from the stop 133 to a stop 134 the nozzle 130 is shut off from the bellows 127 and a pipe 135 connected thereto which may be supplied with compressed air from any suitable source. Located in the pipe 135 is a control valve 136. The pressure within the bellows 127 and accordingly the speed of the hydraulic motor 120 and headstock 2 may be varied by manipulation of the valve 136, increasing or decreasing the pressure within the pipe 128. I show between the valve 136 and the three-way valve 129 a bleed port 137 open to the atmosphere, which permits a flow of pressure fluid through the valve 136, and accordingly it is evident that positioning of the valve 136 will produce corresponding variations in pressure within the pipe 128 and bellows 127.

It is apparent that any suitable tracer mechanism, such as illustrated in Figs. 4, 5 or 6, may be employed in the embodiment of my invention shown in Fig. 7. I have for clarity diagrammatically shown such a mechanism wherein the nozzles 24 and 25 are carried by a horizontal bar supported on the cross-slide 8 and the master feeler is carried by a substantially parallel horizontal baffle pivotally supported on the carriage 7 and urged against the shaped profile of the master 16 by suitable spring means. In operation, movements of the baffle toward or away from the nozzles 24 and 25 effect desired longitudinal movements of the carriage 7 and transverse movements of the cross-slide 8 as heretofore described.

Figures 9, 10, 11:
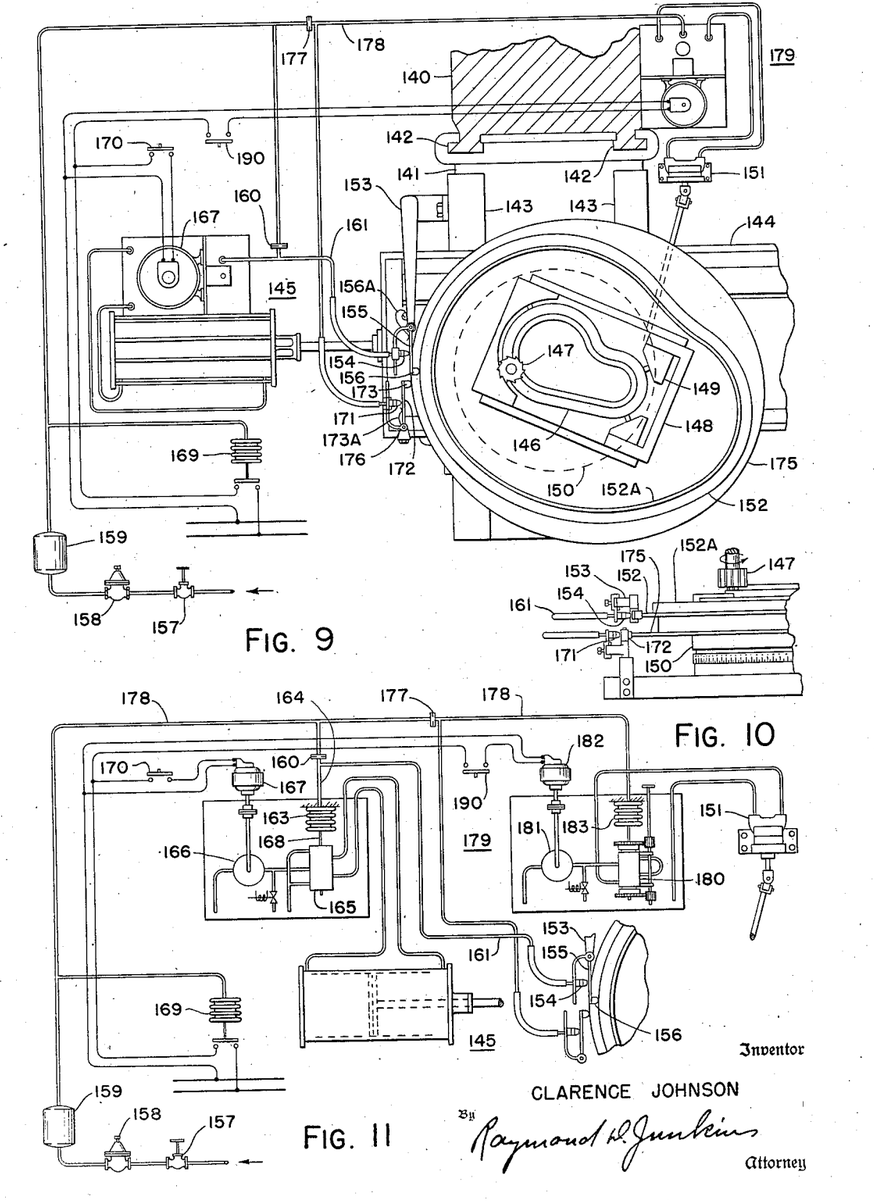
Fig. 9 is a plan view of a milling machine illustrating the application of my invention thereto.
Fig. 10 is a fragmentary view to larger size of a part of Fig. 9.
Fig. 11 is a diagrammatic illustration of the control circuits employed in the embodiment of my invention shown in Fig. 9.

In Figs. 9, 10 and 11 I illustrate the application of my invention to a vertical milling machine, such as shown in my earlier filed copending applications Serial Nos. 298,290 and 384,375. In Fig. 9 I show in sectional plan view so much of a vertical milling machine as is necessary for an understanding of my invention. The milling machine has a vertical column 140 for supporting a knee 141 which is vertically movable along the column 140 in ways 142 formed on the column. The knee 141 is provided with ways 143 along which a saddle (not shown) is movable toward and away from the column 140. The said saddle supports a work table 144 on suitable ways so that the latter is movable to the left and right as shown in the drawings by means of a servo-motor generally indicated at 145.

At 146 is shown a typical work piece consisting of a concave forging of more or less elliptical shape, and in rough form having a raised blank face extending around its entire periphery. The machining operation I have chosen to illustrate my invention as controlling consists in forming a male flange on this blank face. A cutter 147 is rotated by any suitable means (not shown) and engages the work piece 146. It is the purpose of my invention to so control the relative movement between the work piece 146 and cutter 147 that the former will be accurately formed to a desired profile.

The work piece 146 is shown as being secured to a fixture 148 by adjustable clamping means 149. Because of the nature of the machining operation to be performed the fixture 148 is mounted on a circular table 150, shown more clearly in Fig. 10, secured to the work table 144 and rotated at desired speed by a hydraulic motor 151. In Fig. 9 I have shown the operative connections between the motor 151 and table 150 in diagrammatic form, it being evident that suitable reducing gears, universal joints, etc. may be employed as necessary. It is sufficient for the purpose of illustrating my invention to state that the table 150 is rotated at a speed corresponding with the rate of rotation of the motor 151. Machining of the work piece 146 is completed in one revolution of the circular table 150. During the revolution the work piece 150 is moved relative to the cutter 147 and the rate of rotation of the work piece 146 varied so that the cutter 147 accurately profiles the male flange and the work piece.

The fixture 148 has a horizontally extending skirt 152 forming a cam or template which by means now to be described controls the relative movement between the tool and work piece so that the raised flange on the latter is properly formed. The skirt 152 is preferably provided with a raised barrier 152A to hold chips cut from the work piece from scattering.

Secured to the knee 141 is an arm 153 which carries a nozzle 154. The arm 153 also pivotally supports a follower 155 having a projection 156 urged by a spring 156A against the cam 152. As the circular table 150 rotates, changes in the shape of the pattern 152 will cause the follower 155 to be positioned toward or away from the nozzle 154.

The nozzle 154 is supplied with a suitable fluid under pressure, such as compressed air, from any suitable source (not shown) through a shutoff valve 157, a pressure regulating valve 158, a volume tank 159, an orifice 160 and pipe 161. As described with reference to the embodiment of my invention illustrated in Fig. 1, for example, as the follower 155 approaches the nozzle 154, the pressure in pipe 161 between the orifice 160 and nozzle 154 will increase, whereas movements of the follower 155 away from the nozzle 154 will effect corresponding decreases in pressure within the pipe 161.

Variations in pressure within the pipe 161 control the operation of the servo-motor 145. Referring to Fig. 11, it will be observed that the pipe 161 connects to a bellows 163 through a pipe 164. Movements of the bellows 163 control the operation of a pilot valve 165 supplied with hydraulic fluid from a pump 166 driven by a motor 167. So long as a normal distance exists between the nozzle 154 and the follower 155, the movable member 168 of the pilot valve 165 is in the neutral position and the servo-motor 145 remains stationary. When, however, the follower 155 approaches toward or recedes from the nozzle 154 the member 168 is positioned downwardly or upwardly, causing the servo-motor 145 to position the work table 144 accordingly. Thus, for example, assuming the follower 155 to be positioned away from the nozzle 154 by virtue of a change in the contour of the pattern 152, the servo-motor 145 will position the work table 144 in such a direction as to restore the follower 155 to its original position relative to the nozzle 154. In the embodiment of my invention illustrated in Fig. 9, upon the follower 155 being positioned in a counter-clockwise direction, thereby moving away from the nozzle 154, the servo-motor 145 will operate to position the work table 144 to the left as viewed in the drawings until normal distance is restored between the follower 155 and nozzle 154. It is apparent that by proper shaping of the pattern 152 any desired contour may be cut on the work piece 146.

As shown in Fig. 9, and as illustrated in the embodiments of my invention heretofore described, the servo-motor 145 and the hydraulic circuits therefor, including the pilot valve 165, pump 166, and electric motor 167, are preferably arranged in a unit which may be conveniently mounted relative to the milling machine. Likewise suitable control and protective devices may be provided. Thus I show in the electric circuit to the motor 167 a fluid pressure responsive switch 169 adapted to open the circuit to the motor 167 upon failure of fluid pressure. Likewise I show in the circuit to the motor 167 a push button station 170, so that the operation thereof may be started and stopped by an operator.

If the circular table 150 rotates at constant speed, because of the non-circular contour desired on the work piece 146 the relative movement between it and the tool 147 will vary greatly. As will be readily appreciated by those familiar with the art, the uneven feeding resulting from such non-uniform movement will result in an uneven surface on the work piece 146 in those portions where the relative rate of movement between tool and work piece is not at the optimum. Accordingly, my invention contemplates varying the speed of the circular table 150 in accordance with contour of the work piece 146, so that the latter is always moved relative to the tool 147 at an optimum rate of speed. To accomplish this result I show the hydraulic motor 151 under the control of a control couple comprising a nozzle 171 and follower 172, the latter being provided with a projection 173 urged by a spring 173A against a cam 175 secured to the table 150. The nozzle 171 is mounted on the work table 144. The follower 172 is pivotally mounted at 176 to the work table. It will be evident that so long as the cam 175 is circular there will be no change in the distance between the follower 172 and the nozzle 171. A change in radius of the cam 175 will, however, cause the baffle 172 to move toward or away from the nozzle 171.

The nozzle 171 is supplied with compressed air under pressure from the same source as the nozzle 154, through an orifice or other restriction 177. Movements of the follower 172 toward or away from the nozzle 171 cause corresponding variations in pressure within the nozzle 171, which are transmitted through a pipe 178 to a control unit generally indicated at 179. The control unit 179 is similar to the unit illustrated in Fig. 8, and controls the flow of hydraulic fluid to and from the hydraulic motor 151 in accordance with the pressure of the fluid within pipe 178. As explained with reference to the control unit shown in Fig. 8, at one value of pressure the control unit 179 is so arranged that a maximum flow of hydraulic fluid to the motor 151 will be established. As the pressure within pipe 178 increases or decreases from this value, the control unit 179 will act to proportionately decrease the flow of hydraulic fluid to the motor 151, thereby decreasing the rate of speed of the circular table 150.

The cam 175 may be shaped so that when the tool 147 and work piece 146 are relatively moved at maximum speed the baffle 172 is a normal distance from the nozzle 171, and that when the desired shape of the work piece 146 is such that the relative speed between it and the tool 147 is desirably decreased, the radius of the cam 175 is either increased or decreased. By varying or shaping the cam to different radii at different points it is evident that the relative rate of movement between the tool 147 and work piece 146 may be varied as desired.

In Fig. 11 I have shown the control unit 179 diagrammatically and it comprises an adjustable fluid resistance 180 supplied with hydraulic fluid from a pump 181 driven by a motor 182. A bellows 183, to which pipe 178 is connected, positions the movable member of the fluid resistance 180 in accordance with variations in the shape of the cam or pattern 175.

Operation of the motor 182 may be controlled by a suitable switch 190. Also to stop or prevent operation of the motor 182 upon failure of air pressure the switch 169 may be, as shown, connected in circuit with the motor 182.

Throughout the foregoing specification and in the claims to follow I have indicated that the work piece is formed to correspond to the profile or shape of the master. By such language I do not intend to imply that the work piece is brought to the exact shape of the master, but as will be evident to those familiar with the art the master will be formed so that the ultimate shape of the work piece produced is that desired, and that therefore the shape of the work piece will differ from that of the master by the amount of angularity, etc. in the mechanism. Furthermore, I use the terms contour, profile, shape, and the like, in a broad sense and not with any limiting distinction between the profile of a two-dimensional silhouette or the surface configuration of a body, for example.

Certain portions of my invention, disclosed but not claimed herein, are disclosed and claimed in my copending divisional application Serial No. 474,273, and in my continuation-in-part application Serial No. 524,707.

What I claim as new, and desire to secure by Letters Patent of the United States, is:

1. In a duplicator for machine tools and the like having a relatively movable tool and work piece, a pattern having a shape corresponding to the desired shape of the work piece, means for comparing the shape of the work piece to that of the pattern, and power means under the control of said means for comparing the shape of the work piece for relatively moving said tool and work piece.

2. In a duplicator for machine tools and the like having a relatively movable tool and work piece, a pattern having a shape corresponding to the desired shape of the work piece, means for comparing the shape of the work piece with that of the pattern, and power means for relatively moving said tool and work piece to maintain correspondence between the shape of the pattern and that of the work piece.

3. A duplicator for machine tools and the like having a relatively movable tool and work piece, comprising in combination, a pattern having a shape corresponding to the desired shape of the work piece, a differential mechanism having a first part positioned in correspondence with changes in the shape of the pattern, a second part positioned in correspondence with changes in the shape of the work piece, a third part operated by said first two named parts positioned in accordance with changes in the relative positions of said first two named parts, and means under the control of said third part for relatively positioning said tool and work piece.

4. A duplicator for machine tools and the like having a relatively movable tool and work piece, comprising in combination, a pattern having a shape corresponding to the desired shape of the work piece, a first member engaging said pattern and positioned in accordance with changes in the shape thereof, a second member engaging said work piece and positioned in accordance with changes in the shape thereof, and means under the joint control of said members for relatively moving said tool and work piece.

5. A duplicator for machine tools and the like having a relatively movable tool and work piece, means for relatively moving the tool and work piece in one direction to cause the tool to traverse the work piece, and means for moving said tool in a direction transverse to said first direction, comprising, a first element traversing a pattern as the tool traverses the work piece, a second element traversing the work piece as the tool traverses the work piece, and means under the joint control of said elements for positioning the tool relative to the work piece in the second direction.

6. A duplicator for machine tools and the like having a relatively movable tool and work piece, means responsive to changes in the shape of a pattern for causing said tool to move relative to the work piece, and follow-up means responsive to changes in the shape of the work piece for stopping said relative movement when the shape of the work piece corresponds to that of the pattern.

7. A duplicator for machine tools and the like having a tool and work piece relatively movable along two paths, a pattern, a control couple for governing the relative movement of the tool and work piece along both said paths, and means under the joint control of the pattern and work piece for relatively moving the elements of said couple.

8. A tracer mechanism for a machine tool having a relatively movable work piece and tool, comprising in combination, a pattern having a shape corresponding to the desired shape of the work piece, a first member linearly moved in accordance with changes in the shape of said pattern, a second member pivotally mounted on said first member and engaging said work piece, and means for controlling the relative movements of the tool and work piece in accordance with the displacement of said second member from a predetermined position.

9. A tracer mechanism for a machine tool having a relatively movable work piece and tool, comprising in combination, a pattern having a shape corresponding to the desired shape of the work piece, a differential member positioned in accordance with changes in the relative shapes of the pattern and work piece, means for causing said member to traverse the pattern and work piece as the tool traverses the work piece, and means under the control of said member for controlling relative movements between the tool and work piece.

10. In a metal forming machine, a tool and a support therefor actuated by the machine and causing the tool to perform a cutting operation, means by which the tool is caused to traverse a predetermined path to form the work corresponding to the form of a pattern, comprising, a tool actuating element, a differential member arranged to traverse the pattern and work as the tool is caused to traverse the work, and means whereby displacements of said member from a predetermined position cause said tool actuating element to relatively move said tool and work piece.

11. In combination with a lathe having a movable carriage and a tool mounted thereon, a pattern mounted on said lathe having a contour corresponding to the desired contour of a work piece, a member movable with said carriage and scanning said pattern, a bell crank pivotally mounted on said member and having an arm scanning the work piece, and means responsive to relative movements of said member and bell crank for moving said tool relative to said carriage.

12. In a duplicator for machine tools and the like having a relatively movable tool and work piece, means in constant contact with said work piece and positioned in accordance with changes in the shape of the work piece, a member supported by said positioned means and adapted to be moved relative thereto in accordance with changes in the shape of the work piece, and additional means under the control of said member for relatively positioning the tool and work piece.

13. In a duplicator for machine tools and the like having a relatively movable tool and work piece, a gaging device in constant contact with said work piece and having relatively movable parts positioned in accordance with changes in the diameter of the work piece, a control couple mounted on said gaging device and having relatively movable elements positioned in accordance with relative movements of said first named parts, and means under the control of said couple for relatively moving said tool and work piece.

14. In a duplicator for machine tools and the like having a relatively movable tool and work piece, a gaging device comprising a V-block the sloping sides of which are in engagement with the work piece, a plunger supported in said V-block and the center line of which bisects the angle of the V and engages the work piece so that the plunger moves relative to the V-block in accordance with changes in the diameter of the work piece, a control couple having relatively movable elements supported on said V-block and an operative connection between said plunger and one of the elements of said control couple so that a control effect is produced corresponding to the relative positions of said plunger and V-block, and means for relatively positioning the tool and work piece under the control of said control effect.

15. In a duplicator for machine tools and the like having a relatively movable tool and work piece, a gaging device mounted on said duplicator comprising a V-block, the sloping sides of which are in constant engagement with the work piece so that the work piece approaches and recedes from the apex of the V as the diameter of the work piece decreases and increases, means for determining the distance from the apex to the surface of the work piece, and continuously operated means under the control of said last named means for relatively moving said tool and work piece in accordance with the said continuously operated means.

16. In a duplicator for machine tools and the like having a relatively movable tool and work piece, a gaging device comprising a base part in engagement with the work piece and a plunger supported in said base part and movable relative thereto in correspondence with changes in the diameter of the work piece, a pattern movable with the base piece and having a shape corresponding to the desired shape of the work piece, a member jointly positioned by said plunger and pattern, and means under the control of said member for relatively moving the tool and work piece.

17. In a metal forming machine including a tool and a support therefor movable relative to the machine so that the tool may perform a cutting operation, means by which the tool is caused to traverse a predetermined path to form a work piece corresponding to the form of a pattern comprising, a gaging block adapted to traverse the work piece as the tool traverses the work piece, an index member carried by said block and in engagement with the work piece so arranged that it is moved relative to the gaging block in accordance with changes in the shape of the work piece, a support for the pattern positioned by the gaging block as the latter is moved in correspondence with changes in the work piece, and means under the joint control of said pattern and index member for relatively moving the tool and work piece.

18. A tracer mechanism as defined in claim 9 wherein the differential mechanism includes a pivoted baffle and fluid jets of normally constant pressure discharging to atmosphere, the discharge pressure of said jets controlling the relative movements between the tool and the work piece, the relative position of said pivoted baffle to said fluid jets varying the discharge pressures thereof.

19. The combination as defined in claim 11 wherein the member movable with the said carriage and engaging said pattern is a contact follower and the means responsive to relative movements of the contact follower and the bell crank for moving said tool relative to said carriage includes fluid jets of normally constant pressure discharging to atmosphere mounted adjacent the said bell crank whereby movement of the said bell crank varies the discharge rate of said fluid jets.

20. The combination as defined in claim 11 wherein one arm of the said pivoted bell crank overlies a pair of fluid jets of normally constant pressure discharging to atmosphere and the movement of said bell crank arm varies the discharge rate of said jets for controlling the movement of said tool relative to the movement of said carriage.

21. In a duplicator for machine tools of the type having a movable carriage and a tool mounted thereon and a pattern on said carriage having a contour corresponding to the desired contour of a work piece, the combination therewith of a follower movable with said carriage and engaging said pattern, an arm pivoted to said follower and rotated thereon by the contour of the work piece, said pivoted arm having an extension forming a baffle, a pair of fluid jets of normally constant fluid pressure discharging to atmosphere mounted adjacent the said pivoted baffle arm whereby movement thereof will vary the discharge pressure of the said jets, the relative movements of the carriage and the position of the tool relative to the work piece being controlled by the discharge pressures of said jets.

22. A duplicator for machine tools as defined in claim 16, wherein the member jointly positioned by said plunger and pattern comprises a pivoted arm overlying a pair of fluid jets of normally constant pressure discharging to atmosphere whereby movement imparted to the pivoted arm by said plunger varies the discharge rate of said jets for controlling the relative movement of the tool and work piece.

23. A duplicator for machine tools as defined in claim 16, wherein the member jointly positioned by said plunger and pattern comprises a fluid pressure control couple having fluid jets of normally constant pressure discharging to atmosphere, a substantially vertical arm pivoted to the base part of the said gaging device, the lower part of said arm contacting and receiving movement from said plunger, the upper part of said arm lying adjacent to and across the said fluid jets whereby movement imparted to the upper part of said arm varies the discharge pressure of said jets for controlling the relative movement of the tool and work piece.

24. A duplicator for machine tools and the like having a relatively movable tool and workpiece, a pattern, motor means to cause relative movement of said tool and workpiece, a control couple including a feeler for the pattern and a feeler for the workpiece, the elements of said couple being interrelated to control said motor means to cause relative movement between said tool and workpiece.

CLARENCE JOHNSON.